United States Patent
Vlaznev et al.

(10) Patent No.: US 10,496,819 B2
(45) Date of Patent: Dec. 3, 2019

(54) SYSTEM AND METHOD OF DISTRIBUTING FILES BETWEEN VIRTUAL MACHINES FORMING A DISTRIBUTED SYSTEM FOR PERFORMING ANTIVIRUS SCANS

(71) Applicant: AO Kaspersky Lab, Moscow (RU)

(72) Inventors: Denis O. Vlaznev, Moscow (RU); Nikita M. Voitov, Moscow (RU); Maxim A. Vasilyev, Moscow (RU); Maxim E. Naumov, Moscow (RU); Evgeny S. Semenov, Moscow (RU); Alexander Y. Onishchenko, Moscow (RU)

(73) Assignee: AO KASPERSKY LAB, Moscow (RU)

( * ) Notice: Subject to any disclaimer, the term of this patent is extended or adjusted under 35 U.S.C. 154(b) by 157 days.

(21) Appl. No.: 15/432,068

(22) Filed: Feb. 14, 2017

(65) Prior Publication Data

US 2017/0337377 A1    Nov. 23, 2017

(30) Foreign Application Priority Data

May 20, 2016   (RU) ................................ 2016119518

(51) Int. Cl.
   *G06F 21/56*   (2013.01)
   *G06F 9/455*   (2018.01)

(52) U.S. Cl.
   CPC ........ *G06F 21/564* (2013.01); *G06F 9/45558* (2013.01); *G06F 2009/45587* (2013.01); (Continued)

(58) Field of Classification Search
   CPC ........ G06F 21/564; G06F 21/56; G06F 21/55; G06F 21/53; G06F 21/20; G06F 11/00; (Continued)

(56) References Cited

U.S. PATENT DOCUMENTS 6,016,546 A * 1/2000 Kephart .............. G06F 21/564
                                                       726/24
8,370,943 B1   2/2013 Dongre et al.
(Continued)

FOREIGN PATENT DOCUMENTS

| GB | 2466120 A | 9/2009 | ............. G06F 21/00 |
| GB | 2466120 A | * 12/2009 | ............. G06F 21/00 |
| JP | 2017215954 A | 12/2017 | ......... G06F 9/45558 |

OTHER PUBLICATIONS

Asit More, et al., Dynamic malware detection and recording using virtual machine introspection, Jul. 12-12, 2013, DSCI—Best Practices Meet 2013, pp. 1-6.*

*Primary Examiner* — Lisa C Lewis
*Assistant Examiner* — Raied A Salman
(74) *Attorney, Agent, or Firm* — Arent Fox LLP; Michael Fainberg

(57) ABSTRACT

A method and system is provided for detecting malicious files in a distributed network having a plurality of virtual machines. An example method includes: determining and obtaining, by a virtual machine, at least one file for performing an antivirus scan; collecting data relating to characteristics of computing resources of each virtual machine and parameters relating to the antivirus scan; determining an approximation time function of the characteristics of the computing resources and an approximation function of the one or more parameters for determining an approximation time function of effectiveness of the antivirus scan; and beased at least on the approximation time function of effectiveness of the antivirus scan, selecting one virtual machine to perform the antivirus scan in order to determine whether the at least one file is malicious.

20 Claims, 5 Drawing Sheets

(52) U.S. Cl.
CPC .............. *G06F 2009/45591* (2013.01); *G06F 2221/034* (2013.01)

(58) Field of Classification Search
CPC .......... G06F 17/00; G06F 12/14; G06F 12/16; G06F 23/00; G06F 9/45558; G06F 2009/45587; G06F 2009/45591; G06F 2221/034; H04L 9/00
USPC ........................................ 726/24, 1; 713/200
See application file for complete search history.

(56) References Cited

U.S. PATENT DOCUMENTS

| | | | |
|---|---|---|---|
| 9,088,618 B1 | 7/2015 | Gridnev et al. | |
| 9,152,789 B2 | 10/2015 | Natarajan et al. | |
| 9,154,519 B1* | 10/2015 | Godunov | G06F 21/562 |
| 9,165,142 B1* | 10/2015 | Sanders | G06F 21/566 |
| 9,489,516 B1* | 11/2016 | Lu | G06F 21/566 |
| 2005/0149749 A1* | 7/2005 | Van Brabant | G06F 21/564 |
| | | | 726/24 |
| 2006/0136720 A1* | 6/2006 | Armstrong | G06F 21/53 |
| | | | 713/164 |
| 2007/0240217 A1* | 10/2007 | Tuvell | G06F 21/56 |
| | | | 726/24 |
| 2009/0158432 A1* | 6/2009 | Zheng | G06F 21/562 |
| | | | 726/24 |
| 2011/0078318 A1 | 3/2011 | Desai et al. | |
| 2011/0261811 A1 | 10/2011 | Battestilli et al. | |
| 2011/0296382 A1* | 12/2011 | Pasternak | G06F 11/3688 |
| | | | 717/124 |
| 2012/0192276 A1 | 7/2012 | Andrews et al. | |
| 2012/0233696 A1* | 9/2012 | Zeng | G06F 9/00 |
| | | | 726/24 |
| 2012/0304244 A1* | 11/2012 | Xie | G06F 21/00 |
| | | | 726/1 |
| 2013/0097706 A1* | 4/2013 | Titonis | G06F 21/56 |
| | | | 726/24 |
| 2014/0137255 A1* | 5/2014 | Wang | G06F 21/566 |
| | | | 726/24 |
| 2016/0314297 A1* | 10/2016 | Tu | G06F 21/565 |

* cited by examiner

SYSTEM AND METHOD OF DISTRIBUTING FILES BETWEEN VIRTUAL MACHINES FORMING A DISTRIBUTED SYSTEM FOR PERFORMING ANTIVIRUS SCANS

CROSS-REFERENCE TO RELATED APPLICATIONS

This application claims benefit of priority under 35 U.S.C. 119(a)-(d) to a Russian Patent Application No. 2016119518 filed May 20, 2016, which is incorporated by reference herein.

FIELD OF TECHNOLOGY

The invention pertains generally to the field of cybersecurity and, more particularly, to systems and methods of detecting malicious files in a distributed system of virtual machines.

BACKGROUND

The rapid development in the past decade of computer technologies, including cloud technologies, and also the widespread use of diverse computing devices (personal computers, notebooks, tablets, smartphones, etc.), has served as a powerful stimulus for the use of these devices in every possible sphere of human activity and for a tremendous number of tasks (from Internet surfing and communication via Internet to bank transfers and electronic document traffic). In parallel with the growth in numbers of computing devices, the volumes of software running on these devices have also grown at a rapid pace, including malicious software.

At present, a huge number of malicious program varieties exist. Some of them may steal personal and confidential data from the devices of users (such as logins and passwords, bank details, electronic documents). Others may form so-called botnets from the devices of users to guess passwords using the brute force method or launch attacks such as a denial of service (Distributed Denial of Service, DDOS) against other computers or computer networks. Still others may foist paid content onto users through aggressive advertising, paid subscriptions, sending of text messages to paid phone numbers, and so forth.

Antivirus programs may be used to defeat malicious programs. An effective solution may require first and foremost a timely detection of files containing the code of malicious programs, for which the antivirus programs may employ various technologies, such as signature, heuristic and proactive analysis, white and black lists, and so forth. Each of the above-mentioned technologies may have its own effectiveness in detecting malicious files, based on its potential ability to detect certain malicious files and on the requirements on the computing resources of the computer system on which the technology running.

At present, the volumes of data (including files) being processed by computer systems are so vast that their antivirus scanning by antivirus programs may take a long time and demand substantial computing resources, which is especially critical for the users of personal computers. Therefore, in order to increase the effectiveness of detection of malicious files, methods of increasing the computing resources of the computer systems on which the search for malicious files takes place may be used. For example, distributed systems may be used to search for malicious files. Such systems may comprise several servers, and on each server only a portion of the files needing to be scanned is scanned.

The known operating methods may be ineffective when there is a heavy workload on the computer systems performing the antivirus scanning of files, or when some of the computer systems taking part in the antivirus scanning of files are malfunctioning.

SUMMARY

Disclosed are systems and methods of detecting malicious files in a distributed system of virtual machines. In one exemplary aspect, a method for detecting malicious files in a distributed network having a plurality of virtual machines, comprising: determining and obtaining, by a virtual machine of the plurality of virtual machines, at least one file stored on the virtual machine for performing an antivirus scan; collecting, by the virtual machine, data relating to characteristics of computing resources of the plurality of virtual machines and one or more parameters relating to the antivirus scan; determining an approximation time function of the characteristics of the computing resources of the plurality of virtual machines and an approximation function of the one or more parameters relating to the antivirus scan based at least on collected data; determining an approximation time function of effectiveness of the antivirus scan based at least on the approximation time function of the characteristics of the computing resources and the approximation function of the one or more parameters; and beased at least on the approximation time function of effectiveness of the antivirus scan, selecting at least one virtual machine from the plurality of virtual machines to perform the antivirus scan in order to determine whether the at least one file is malicious.

In another exemplary aspect, selecting the at least one virtual machine comprises determining the most effective start time for performing the antivirus scan by fulfilling at least on one of the following criteria: the antivirus scan taking the least time; the antivirus scan taking less time than scheduled; the antivirus scan that will be completed no later than a scheduled time; a minimum number of computing resources of the virtual machine is needed to perform the antivirus scan; or fewer computing resources of the virtual machine than scheduled are needed to perform the antivirus scan.

In yet another exemplary aspect, selecting at least one virtual machine comprises: detecting that the at least one virtual machine is able to at least perform the antivirus scan of the at least one file using computing resources available in a scheduled time slot; detecting the at least one virtual machine with the lowest calculated workload level among the plurality of virtual machines in the distributed network; detecting the at least one virtual machine with a calculated workload level lower than an established threshold value; or detecting no less than two virtual machines of the plurality of virtual machines whose combined calculated workload level is less than the combined workload level of the remaining virtual machines of the plurality of virtual machines.

In another exemplary aspect, collecting the data relating to the characteristics of computing resources of the plurality of virtual machines comprises at least one of: detecting a time period between obtaining the at least one file and determining whether the at least one file is malicious; detecting a number of files transmitted to the virtual machine for the antivirus scan; and determining a computing capacity of each of the plurality of the virtual machines.

In another exemplary aspect, the one or more parameters relating to the antivirus scan comprise at least one of: methods for detecting malicious files used by the plurality of virtual machines, the methods comprising at least one of: a signature analysis, a heuristic analysis, an analysis of emulation results, and an analysis of black and white lists; and the characteristics of computing resources of the plurality of virtual machines used for performing the antivirus scan. The methods for detecting malicious files are determined based at least on the maximum time during which the antivirus scan takes place, and an emulation depth of files being scanned.

In yet another exemplary aspect, the approximation time function of the characteristics of the computing resources of the plurality of virtual machines is determined based at least on the collected data relating to the characteristics of the computing resources of each virtual machine, characteristics of computing resources of each virtual machine which are accessible at a selected time, the time of determination of characteristics of the computing resources of each virtual machine, and the time for which it is necessary to determine the characteristics of the computing resources of each virtual machine.

In yet another exemplary aspect, the approximation function of the one or more parameters relating to the antivirus scan is determined based at least on data relating to presumptive parameters of the antivirus scan for the characteristics of the computing resources, and characteristics of the computing resources of eachvirtual machine for performing the antivirus scan.

In another example aspect, the approximation time function of effectiveness of the antivirus scan is determined based on parameters defining a type and size of the at least one file.

In accordance with exemplary aspects of the invention, a system for detecting malicious files in a distributed network having a plurality of virtual machines, the system comprising: a virtual machine of the plurality of virtual machines having at least one thin client operating thereon, the virtual machine being configured to: determine and obtain at least one file stored on the virtual machine for performing an antivirus scan; collect data relating to characteristics of computing resources of the plurality of virtual machines and one or more parameters relating to the antivirus scan; determine an approximation time function of the characteristics of the computing resources of the plurality of virtual machines and an approximation function of the one or more parameters relating to the antivirus scan based at least on collected data; determine an approximation time function of effectiveness of the antivirus scan based at least on the approximation time function of the characteristics of the computing resources and the approximation function of the one or more parameters; and beased at least on the approximation time function of effectiveness of the antivirus scan, select at least one virtual machine from the plurality of virtual machines to perform the antivirus scan in order to determine whether the at least one file is malicious.

Additionaly, in accordance with other exemplary aspect of the invention, a non-transitory computer readable medium storing thereon computer executable instructions for detecting malicious files in a distributed network having a plurality of virtual machines, including instructions for: determining and obtaining, by a virtual machine of the plurality of virtual machines, at least one file stored on the virtual machine for performing an antivirus scan; collecting, by the virtual machine, data relating to characteristics of computing resources of the plurality of virtual machines and one or more parameters relating to the antivirus scan; determining an approximation time function of the characteristics of the computing resources of the plurality of virtual machines and an approximation function of the one or more parameters relating to the antivirus scan based at least on collected data; determining an approximation time function of effectiveness of the antivirus scan based at least on the approximation time function of the characteristics of the computing resources and the approximation function of the one or more parameters; and beased at least on the approximation time function of effectiveness of the antivirus scan, selecting at least one virtual machine from the plurality of virtual machines to perform the antivirus scan in order to determine whether the at least one file is malicious.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method and computer program product for detecting malicious files in a distributed network having a plurality of virtual machines. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The following definitions will be used in describing various aspects of the invention:

A protected virtual machine may include a virtual machine working under the control of a hypervisor, with an installed guest operating system, in the computational environment of which a thin client is executing.

A protecting virtual machine may be a virtual machine working under the control of a hypervisor, with an installed operating system, in the environment of which a protection server is working.

A thin client may include software configured to protect a protected virtual machine against malicious programs and computer threats and to transmit files for the antivirus scan in the network to the protecting virtual machines.

A protection server may include software configured to perform an antivirus scan of files received from protected virtual machines.

Figure 1:
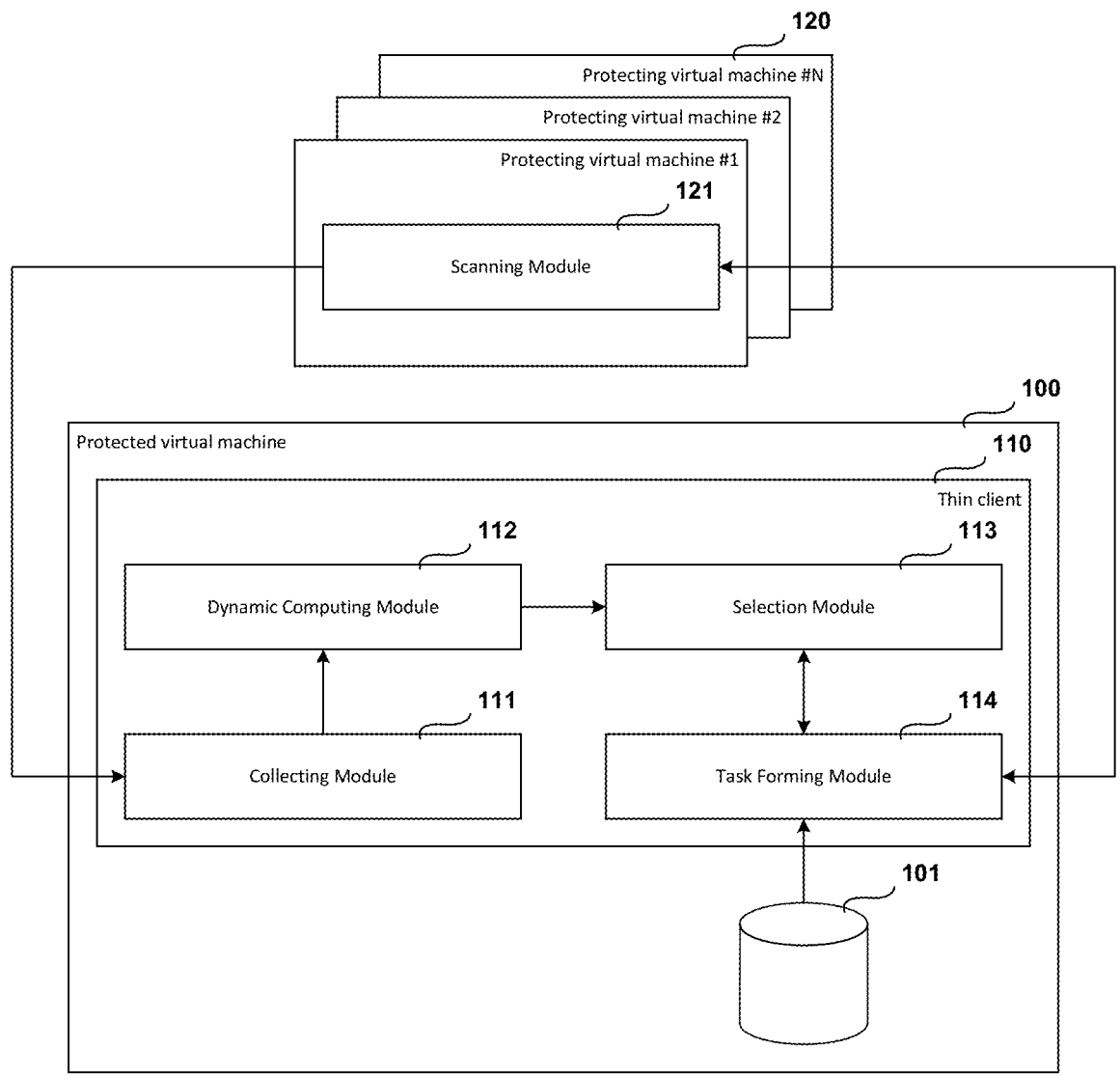
FIG. 1 illustrates an exemplary system for detecting malicious files on a virtual machine according to aspects of the invention.

FIG. 1 illustrates an exemplary system for detection of malicious files on a virtual machine according to aspects of the invention. The structural diagram of the system for detection of malicious files on a virtual machine may include a protected virtual machine 100, a storage of files requiring an antivirus scan 101, a thin client module 110, a collecting module 111, a dynamic computing module 112, a selection module 113, a task forming module 114, a protecting virtual machine 120, and a scanning module 121.

The system for detection of malicious files on a virtual machine may contain a protected virtual machine 100, working under the control of a hypervisor, with an installed guest operating system, in the environment of which a thin client 110 is working, and protecting virtual machines 120, working under the control of a hypervisor and with an installed operating system, in the environment of each of which a scanning module 121 is working.

The protecting virtual machine 120 may be configured to carry out an antivirus scan on files received from the thin client 110, and it may contain the scanning module 121.

The scanning module 121 may be configured to:
carry out an antivirus scan on files received from the task forming module 114; and
pronounce a verdict on the detection of malicious files.

The protected virtual machine 100 may be configured to detect the files requiring an antivirus scan in the storage of files 101 and transfer these to the thin client module 110 for performing an antivirus scan.

The thin client module 110 may be configured to protect the protected virtual machine 100 against malicious files and it may include a collecting module 111, a dynamic computing module 112, a selection module 113, and a task forming module 114.

The collecting module 111 may be configured to:
collect the characteristics of the computing resources of the protecting virtual machines 120;
collect the parameters of the antivirus scan of the scanning module 121, where the scanning module 121 may be installed on the corresponding protecting virtual machines 120, the parameters dictating the rules for use by the scanning module 121 of the computing resources of the corresponding protecting virtual machines 120, wherein the mentioned rules of use dictate which computing resources of the protecting virtual machine 120 may be provided to the scanning module 121 to carry out the particular actions comprising the antivirus scan;
transmit the collected characteristics of the computing resources and the parameters of the antivirus scan to the dynamic computing module 112.

The characteristics of the computing resources of the protecting virtual machine 120 may include:
the time passed between the receiving of the files from the task forming module 114 to the pronouncing of the verdict by the scanning module 121;
the number of files transmitted to the scanning module 121 for the antivirus scan;
the computing capacity of the protecting virtual machine 120 on which the scanning module 121 is running.

For example, in accordance with one aspect of the invention, the collected characteristics of the computing resources of the protecting virtual machine 120 on which the scanning module 121 is running may be generalized to form a single characteristic of the computing resources of the protecting virtual machine 120, which may include a set of numbers:

$$\{\Delta, N, \{M, B\}\}_i$$

for each established point in time $t_i$ of transmission of the collected data to the dynamic computing module 112, where:
$\Delta$-is the time passed between the reception of the files by the task forming module 114 from the storage of files 101 to the pronouncing of the verdict by the scanning module 121;
N-is the number of files transmitted to the scanning module 121 to carry out the antivirus scan at the point in time $t_i$;
M-is the volume of free memory of the protecting virtual machine 120 at the point in time $t_i$;
B-is the CPU load of the protecting virtual machine 120 at the point in time $t_i$.

The described set of numbers may be sufficient to calculate a multidimensional approximation function (one of whose coefficients is time) may define the behavior of the scanning module 121.

The parameters of the antivirus scan being performed by the scanning module 121 may include:
the methods of detection of malicious files that are used by the scanning module 121 to perform the antivirus scan, where the methods of detection of malicious files may include:
signature analysis,
heuristic analysis,
analysis of emulation results,
analysis of black and white lists;
the characteristics of the computing resources, being used by the scanning module 121 to perform the antivirus scan.

The parameters which may define the methods of detection of malicious files may include:
the maximum time during which the antivirus scan takes place;
the depth of emulation of the files being scanned.

The computing capacity of the protecting virtual machine 120 on which the scanning module 121 is running may include:
the RAM of the protecting virtual machine 120 in which the scanning module 121 is running;
the CPU performance of the protecting virtual machine 120.

The parameters used by the scanning module 121 to perform the antivirus scan of the files may affect the accuracy of the verdict pronounced by the scanning module 121, e.g., the chance of not detecting a malicious file among malicious files or, conversely, the chance of detecting a malicious file among legitimate files when performing the antivirus scan. For example, the scanning module 121 of the protecting virtual machine #1 120.1 may perform a scan for each file received from the task forming module 114 with the aid of signature analysis in no more than 0.01 s, the scanning module 121 of the protecting virtual machine #2 120.2 may use heuristic analysis with a depth of emulation of the files scanned (maximum number of nested calls) equal to 10 in no more than 0.1 s, and the scanning module 121 of the protecting virtual machine #3 120.3 may use heuristic analysis with a depth of emulation of the files scanned equal to 1000 in no more than 0.04 s. As a result, it turns out that the most effective scanning means, i.e., the scanning means using the largest volume of computing resources of the protecting virtual machine may include using the scanning module 121 running on the protecting virtual machine #3 120.3, even though the fastest one may include using the scanning module 121 running on the protecting virtual machine #1 120.1.

The dynamic computing module 112 may be configured to:

determine the approximation time function of the characteristics of the computing resources for each protecting virtual machine 120 on the basis of an analysis of the characteristics of the computing resources collected by the collecting module 111, where the approximation function in question may be presented as:

$$\{C\}_{t_k} = F_{char}(\{\{C\}_{t_i} \ldots \{C\}_{t_j}\}, t_k)$$

where:
- $F_{char}$-is the approximation time function,
- $\{C\}_{t_i}$-are the characteristics of the computing resources of the protecting virtual machine 120 collected by the collecting module 111,
- $\{C\}_{t_k}$-are the characteristics of the computing resources of the protecting virtual machine 120 which are accessible at the point in time $t_k$,
- $t_i$, $t_j$-is the time of determination of the characteristics of the computing resources of the protecting virtual machine 120,
- $t_k$-is the time for which it is necessary to determine the characteristics of the computing resources of the protecting virtual machine 120;

and it may be defined by the parameters $a_1, a_2, \ldots a_i$, such that the approximation function in question may be presented in the form:

$$\{C\}_{t_k} = F_{char}(a_1, a_2, \ldots, a_i, t_k).$$

determine the approximation function of the parameters of the antivirus scan of each scanning module 121 in dependence on the characteristics of the computing resources of the corresponding protecting virtual machine 120 on the basis of an analysis of the parameters of the antivirus scan collected by the collecting module 111, this approximation function may have the following form:

$$\{P\}_{C_k} = F_{params}(\{\{P\}_{C_i} \ldots \{P\}_{C_j}\}, C_k),$$

where:
- $F_{params}$-is the approximation function,
- $\{P\}_{C_{i,j}}$-are the parameters of the antivirus scan as collected by the collecting module 111, being dependent on the characteristics of the computing resources $C_i$,
- $\{P\}_{C_k}$-are the presumptive parameters of the antivirus scan for the characteristics of the computing resources $C_k$,
- $C_{i,j}$-are the characteristics of the computing resources of the protecting virtual machine 120, being used by the scanning module 121 when performing the antivirus scan;

and it may be defined by the parameters $b_1, b_2, \ldots b_i$, so that the approximation function in question may be presented in the form:

$$\{P\}_{C_k} = F_{params}(b_1, b_2, \ldots, b_i, C_k).$$

determine the approximation time function of the effectiveness of the antivirus scan on each protecting virtual machine 120 as a composition (function composition) of the determined functions, where the function composition is a function obtained by applying one function to the results of another function, the effectiveness of the antivirus scan characterizing the volume of computing resources needed by the protecting virtual machine 120 to achieve the established result of the antivirus scan, the approximation function in question having the form:

$$E = F_{efficiency}(\{F\}, \{C\}, \{P\}),$$

where:
- $F_{efficiency}$-is the approximation function,
- $\{F\}$-are parameters characterizing the files received by the task forming module 114, where the parameters may define:
  - the file type, and
  - the file size,
- $\{C\}$-are parameters describing the approximation time function of the characteristics of the computing resources of the protecting virtual machine 120,
- $\{P\}$-are parameters describing the approximation function of the parameters of the antivirus scan performed by the scanning module 121 in dependence on the characteristics of the computing resources of the protecting virtual machine 120;

and it may be defined by the parameters $e_1, e_2, \ldots e_i$, such that the approximation function in question may be presented in the form:

$$E_{t_k} = F_{efficiency}(e_1, e_2, \ldots, e_i, t_k).$$

and transmit the determined approximation time function for the effectiveness of the antivirus scan on each protecting virtual machine 120 to the selection module 113.

The parameters defining the approximation time function of the characteristics of the computing resources of the protecting virtual machine 120 may be the numerical coefficients for the approximation function of the kind:

$$F_{CHAR}(\{\{C\}_{t_i} \ldots \{C\}_{t_j}\}) = a_i \times C^i + a_{i+1} \times C^{i+1} + \ldots + a_j \times C^j,$$

where:
- $\{C\}_{t_i}$-are the characteristics of the computing resources of the protecting virtual machine 120 collected by the collecting module 111,
- $t_i$-is the time of gathering the characteristics of the computing resources of the protecting virtual machine 120,
- $a_i$-are numerical coefficients describing the approximation function.

The parameters defining the approximation function of the parameters of the antivirus scan being performed by the scanning module 121 in dependence on the characteristics of the computing resources of the protecting virtual machine 120 may include numerical coefficients for the approximation function of the kind:

$$F_{PARAMS}(\{\{P\}_{t_i} \ldots \{P\}_{t_j}\}) = b_i \times P^i + b_{i+1} \times P^{i+1} + \ldots + b_j \times P^j,$$

where:
- $\{P\}_{C_i}$-are the parameters of the antivirus scan being performed by the scanning module 121 as collected by the collecting module 111,
- $C_i$-are the characteristics of the computing resources of the protecting virtual machine 120,
- $b_i$-are numerical coefficients defining the approximation function.

The workload level of the scanning module 121 of the protecting virtual machines 120 may act as the effectiveness of the antivirus scan on the protecting virtual machine 120.

The workload level of the scanning module 121 of the protecting virtual machine 120 may be calculated as the superposition of the set of parameters defining the approximation time function of the characteristics of the computing resources of the protecting virtual machine 120 and the set of parameters defining the approximation function of the parameters of the antivirus scan being performed by the scanning module 121 in dependence on the characteristics of the computing resources of the protecting virtual machine 120, having the form:

$$F_{BUSY}(\{F\}, \{C\}, \{P\})=C(\{F\})\times P(\{F\}),$$

where:
- {F}-are parameters characterizing the files received by the task forming module 114,
- {C}-are parameters defining the approximation time function of the characteristics of the computing resources of the protecting virtual machine 120,
- {P}-are parameters describing the approximation function of the parameters of the antivirus scan being performed by the scanning module 121 in dependence on the characteristics of the computing resources of the protecting virtual machine 120.

Regression analysis methods may be used to calculate the parameters in defining the approximation time functions.

For example, in the case where the RAM volume used to perform the antivirus scan of files is the characteristic of the computing resources of the protecting virtual machine 120, a linear function may be determined as the approximation function, as described by the formula:

$$F(X)=a_1 \times X + a_2$$

In this case, the parameters $a_1$, $a_2$ may be calculated as:

$$a_1 = \frac{n \times \sum_{i=1}^{n} t_i \times X_i - \sum_{i=1}^{n} t_i \times \sum_{i=1}^{n} X_i}{n \times \sum_{i=1}^{n} t_i^2 - \left(\sum_{i=1}^{n} t_i\right)^2},$$

$$a_2 = \frac{\sum_{i=1}^{n} X_i - a_1 \times \sum_{i=1}^{n} t_i}{n},$$

where:
- n-is the number of timestamps during which values of the RAM volume being used in the performance of the antivirus scan were obtained,
- $t_i$-is the timestamp of obtaining a value of the RAM volume $X_i$ being used to perform the antivirus scan,
- $X_i$-is the value of the RAM volume $X_i$ being used to perform the antivirus scan at the point in time $t_i$.

The selection module 113 may be configured to:
- select the scanning module 121 on the basis of the effectiveness function of the antivirus scan obtained from the dynamic computing module 112;
- determine for the selected scanning module 121 the start time for the performance of the antivirus scan such that at least one of the following criteria may be fulfilled:
  - the antivirus scan takes the least time;
  - the antivirus scan takes less time than scheduled;
  - the antivirus scan will be completed not later than the scheduled time;
  - a minimum number of computing resources of the protecting virtual machine 120 is needed to perform the antivirus scan;
  - fewer computing resources of the protecting virtual machine 120 than scheduled are needed to perform the antivirus scan;
- send information on the selected scanning module 121 to the task forming module 114, containing the most effective start time for performance of the antivirus scan by the selected scanning module 121.

The selected scanning module 121 may include:
- the scanning means able to at least perform the antivirus scan of the files determined by the task forming module 114, using the computing resources available in the scheduled time slot;
- the scanning module 121 with the lowest calculated workload level;
- the scanning module 121 with a calculated workload level lower than an established threshold value;
- if an antivirus scan of not less than two files is needed, at least two scanning module 121 out of the set of scanning module 121 whose combined calculated workload level is less than the combined workload level of the remaining scanning module 121.

For example, the workload level of the scanning module 121 may be determined and calculated as follows: there are 3 files of size 10 MB, 20 MB and 50 MB, respectively, for which it is necessary to perform an antivirus scan; the scanning module 121 has presented parameters describing the antivirus scan as a signature analysis taking at most 0.01 s, while the characteristic of the protecting virtual machine 120 on which the scanning module 121 is running may have an available RAM volume of 60 MB. Signature analysis means that the file will be placed in the RAM as is, i.e., it will take up the same volume as its size. In order for the workload of the scanning module 121 to be at maximum, it needs to transmit the aforementioned 3 files in two stages: in the first stage, file #1 and file #3, in the second stage, file #2. As a result, the antivirus scan of all three files will take 0.02 s, the workload level of the scanning module 121 will be 1 and 0.3(3), respectively, and the resulting workload for the mentioned three files will be 0.6(6), which is the most optimal result, given that during the scanning of file #2 the scanning module 121 will have sufficient computing resources to process new files. In the present case, the workload level may be calculated as:

$$F_{BUSY}(\{F\}, \{C\}, \{P\})=\text{FILE}_{SIZE} \times \text{SERVER}_{TIME} \times \text{MEMORY}_{FREE}.$$

The task forming module 114 may be configured to:
- determine the files of the protected virtual machine 100 on which the thin client module 110 is running for performance of the antivirus scan;
- send commands to the collecting module 111 to perform the collection of the characteristics of the computing resources of the protecting virtual machines 120 and the parameters of the antivirus scan of the scanning module 121; and
- transfer the determined files to the scanning module 121, the information on which has been provided by the selection module 113, according to the scanning time as determined by the selection module 113.

For example, in the case where the scanning module 121 of the protecting virtual machine 120 has been selected, the antivirus scan of the file may be performed at once or after a certain time. In the event that the scanning module 121 is already performing an antivirus scan of files received from the task forming module 113 prior to this, the antivirus scan of the new file may not be done, and the file may be stored (for example, on the hard drive of the protecting virtual machine 120) until the antivirus scan being performed is finished, after which the file may be loaded from the hard drive into memory, and the scanning module 121 may perform the antivirus scan. In the described working logic of the scanning module 121, two time-consuming but non-mandatory operations (if the work is organized properly) may be performed—the writing of the file to disk and the reading of the file from disk. But if the mentioned file is dispatched to the scanning module 121 not right after the selection of the scanning module 121, but during a later time when the scanning module 121 may have performed its previous tasks, the antivirus scan of the file may be performed more quickly.

In one exemplary aspect, detecting of malicious files of a distribution of 1000 files, of total volume 1 GB, by a thin client 110 of a protected virtual machine 100 among three protecting virtual machines 120 (120.1, 120.2 and 120.3) may be performned. Scanning module 121 for performing an antivirus scan may employ signature analysis, heuristic analysis, and an analysis according to white and black lists, respectively. Each type of the aforementioned analysis methods may have its own effectiveness (0.6, 0.95 and 0.1, respectively) and may require its own computing resources (200 MB of free RAM, CPU with operating speed not less than 100 MFLOPS plus 50 MB of free RAM and CPU with operating speed not less than 10 MFLOPS plus 10 MB of free RAM, respectively), which means that on average each scanning module 121 may process the file in 0.01, 0.1 and 0.002 s, respectively.

In the beginning, when no statistics on the working of the protecting virtual machine 120 may be available, the files may be distributed uniformly by the task forming module 114 in accordance with how fast the given protecting virtual machine 120 may perform the antivirus scan. In the course of time, the dynamic computing module 112 may accumulate statistics on the characteristics of the computing resources and the parameters of the antivirus scan of all the protecting virtual machines 120 at different points in time, which makes it possible to calculate the approximation functions of the characteristics and the parameters.

For the protecting virtual machine #1 120.1, only the volume of free RAM may be important, the change in which obeys the linear time law $M(t)=a_1 \times t + a_2$. On the basis of the collected data $\{M_{t_i}, t_i\}$, the parameters $a_1$ and $a_2$ may be calculated by the method of least squares, which makes it possible to predict how much available RAM the protecting virtual machine #1 120.1 may have at the time $t_i$ of sending of the file for performance of the antivirus scan to the scanning module 121 of the protecting virtual machine #1 120.1. Knowing how much RAM may be available at any given point in time, the task forming module 114 may estimate which files maybe sent to the scanning module 121 in order for those files to be processed in a minimum time.

Similar steps are taken for the protecting virtual machine #2 120.2 and #3 120.3, where besides the RAM the CPU operating speed may also be used. By estimating the CPU load of the protecting virtual machine 120, which obeys the law $B(t)=a_1 \times t^3 + a_2 \times t^2 + a_3 \times t + a_4$, the parameters $a_1$, $a_2$, $a_3$, $a_4$ may be calculated. After this, the CPU load of the protecting virtual machine 120 at the time $t_i$ of sending the file for performance of the antivirus scan to the scanning module 121 of the protecting virtual machine #2 120.2 (or #3 120.3) is predicted. In this way, one achieves the effect that the CPU of the protecting virtual machine 120 has a maximum effective load.

As a result of the distribution of tasks among the scanning module 121 of the various protecting virtual machines 120, an increase in the speed of performance of the antivirus scan for the files of the protected virtual machine 100 may be accomplished, since the protecting virtual machines 120 may be used with higher effectiveness than in the case of a uniform or random distribution of files among the protecting virtual machines 120.

Figure 2:
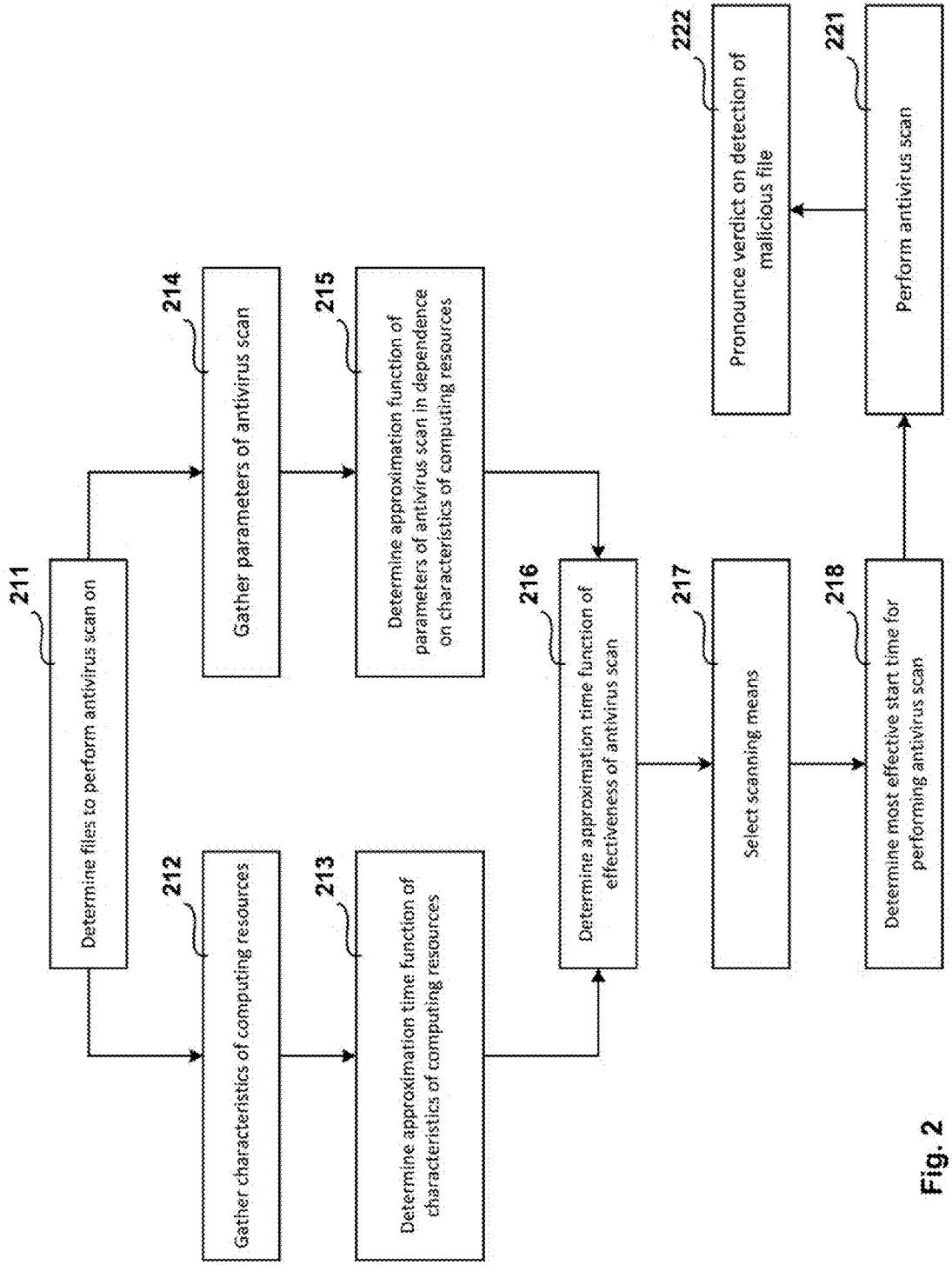
FIG. 2 illustrates an exemplary method for detecting malicious files on a virtual machine according to aspects to the invention.

FIG. 2 illustrates an exemplary method for detecting malicious files on a virtual machine according to aspects of the invention. The structural diagram of the method of detection of malicious files on a virtual machine may comprise the step 211, in which files may be determined for performance of the antivirus scan, step 212, in which the characteristics of the computing resources may be collected, step 213, in which the approximation time function may be determined for the characteristics of the computing resources, step 214, in which the parameters of the antivirus scan may be collected, step 215, in which the approximation function may be determined for the parameters of the antivirus scan in dependence on the characteristics of the computing resources, step 216, in which the approximation time function may be determined for the effectiveness of the antivirus scan, step 217, in which the scanning module 121 may be selected, step 218 in which the most effective start time may be determined for performing the antivirus scan, step 221, in which the antivirus scan may be performed, and step 222, in which a verdict may be pronounced as to the detection of a malicious file.

In step 211, the files stored in the storage of files 101 of the protected virtual machine 100 on which the aforementioned thin client 110 is running may be determined for the performance of the antivirus scan.

In step 212, the characteristics of the computing resources of the protecting virtual machine 120 on which the scanning module 121 is running may be determined and collected.

In one exemplary aspect, step 212 may be performed at the same time as step 214.

The characteristics of the computing resources of the protecting virtual machine 120 may include:
- the time passed between the receiving of the files from the task forming module 114 to the pronouncing of the verdict by the scanning module 121;
- the number of files transmitted to the scanning module 121 for the antivirus scan; and
- the computing capacity of the protecting virtual machine 120 on which the scanning module 121 is running.

The computing capacity of the protecting virtual machine 120 on which the scanning module 121 is running may include:
- the RAM of the protecting virtual machine 120 in which the scanning module 121 is running;
- the CPU performance of the protecting virtual machine 120.

In step 213, the approximation time function of the characteristics of the computing resources for each protecting virtual machine 120 may be determined on the basis of an analysis of the characteristics of the computing resources collected in step 212, where the approximation function in question may have the form:

$$\{C\}_{t_k} = F_{char}(\{\{C\}_{t_i} \ldots \{C\}_{t_j}\}, t_k),$$

where:
- $F_{char}$-is the approximation time function,
- $\{C\}_{t_{i,j}}$-are the characteristics of the computing resources of the protecting virtual machine 120 collected in step 212, $\{C\}_{t_k}$-are the characteristics of the computing resources of the protecting virtual machine 120 which are accessible at the point in time $t_k$, $t_i$, $t_j$-is the time of determination of the characteristics of the computing resources of the protecting virtual machine 120, $t_k$-is the time for which it is necessary to determine the characteristics of the computing resources of the protecting virtual machine 120;

and it may be defined by the parameters $a_1, a_2, \ldots a_i$, that the approximation function in question may be presented in the form:

$$\{C\}_{t_k}=F_{char}(a_1, a_2, \ldots, a_i, t_k).$$

The parameters defining the approximation time function of the characteristics of the computing resources of the protecting virtual machine 120 may include the numerical coefficients for the approximation function of the kind:

$$F_{CHAR}(\{\{C\}_{t_i} \ldots \{C\}_{t_j}\}=a_i \times C^i+a_{i+1} \times C^{i+1}+ \ldots +a_j \times C^j,$$

where:

$\{C\}_{t_i}$-are the characteristics of the computing resources of the protecting virtual machine 120 collected by the collecting module 111, $t_i$-is the time of gathering the characteristics of the computing resources of the protecting virtual machine 120, $a_i$-are numerical coefficients describing the approximation function.

Regression analysis methods may be used to calculate the parameters describing the approximation time functions.

In step 214, the parameters of the antivirus scan of the scanning module 121 which may be installed on the corresponding protecting virtual machines 120 may be determined, these parameters dictating the rules of use by the scanning module 121 of the computing resources of the corresponding protecting virtual machines 120.

In one exemplary aspect, step 214 may be performed at the same time as step 212.

The parameters of the antivirus scan being performed by the scanning module 121 may include:

the methods of detection of malicious files that are used by the scanning module 121 to perform the antivirus scan, where the methods of detection of malicious files may include:

signature analysis,
heuristic analysis,
analysis of emulation results, and
analysis of black and white lists;

the characteristics of the computing resources, the characteristics being used by the scanning module 121 to perform the antivirus scan.

The parameters which may define the methods of detection of malicious files may include:

the maximum time during which the antivirus scan takes place; and the depth of emulation of the files being scanned.

In step 215, the approximation function of the parameters of the antivirus scan of each scanning module 121 in dependence on the characteristics of the computing resources of the corresponding protecting virtual machine 120 may be determined on the basis of an analysis of the parameters of the antivirus scan collected in step 214, this approximation function having the form:

$$\{P\}_{C_k}=F_{params}(\{\{P\}_{C_i} \ldots \{P\}_{C_j}\}, C_k),$$

where:

$F_{params}$-is the approximation function, $\{P\}_{C_{i,j}}$-are the parameters of the antivirus scan as collected by the collecting module 111, being dependent on the characteristics of the computing resources $\{P\}_{C_k}$-are the presumptive parameters of the antivirus scan for the characteristics of the computing resources $C_k$, $C_{i,j}$-are the characteristics of the computing resources of the protecting virtual machine 120, being used by the scanning module 121 when performing the antivirus scan;

and being defined by the parameters $b_1, b_2, \ldots b_i$, so that the approximation function in question may be presented in the form:

$$\{P\}_{C_k}=F_{params}(b_1, b_2, \ldots, b_i, C_k).$$

The parameters defining the approximation function of the parameters of the antivirus scan being performed by the scanning module 121 in dependence on the characteristics of the computing resources of the protecting virtual machine 120 may include numerical coefficients for the approximation function of the kind:

$$F_{PARAMS}(\{\{P\}_{t_i} \ldots \{P\}_{t_j}\}=b_i \times P^i+b_{i+1} \times P^{i+1}+ \ldots +b_j \times P^j,$$

where:

$\{P\}_{C_i}$-are the parameters of the antivirus scan being performed by the scanning module 121 as collected by the collecting module 111, $C_i$-are the characteristics of the computing resources of the protecting virtual machine 120, $b_i$-are numerical coefficients defining the approximation function.

In step 216, the approximation time function of the effectiveness of the antivirus scan on each protecting virtual machine 120 may be determined as a composition of the functions determined in steps 213 and 215, where the function composition may include a function obtained by applying one function to the results of another function, the effectiveness of the antivirus scan characterizing the volume of computing resources needed by the protecting virtual machine 120 to achieve the established result of the antivirus scan, the approximation function in question having the form:

$$E=F_{efficiency}(\{F\}, \{C\}, \{P\}),$$

where:

$F_{efficiency}$-is the approximation function, $\{F\}$-are parameters characterizing the files received by the task forming module 114, where the parameters may include:
the file type, and
the file size, $\{C\}$-are parameters describing the approximation time function of the characteristics of the computing resources of the protecting virtual machine 120, $\{P\}$-are parameters describing the approximation function of the parameters of the antivirus scan performed by the scanning module 121 in dependence on the characteristics of the computing resources of the protecting virtual machine 120;

and it may be defined by the parameters $e_1, e_2, \ldots e_i$, such that the approximation function in question may be presented in the form:

$$E_{t_k}=F_{efficiency}(e_1, e_2, \ldots, e_i, t_k).$$

The workload level of the scanning module 121 of the protecting virtual machines 120 may act as the effectiveness of the antivirus scan on the protecting virtual machine 120.

The workload level of the scanning module 121 of the protecting virtual machine 120 may be calculated as the superposition of the set of parameters defining the approximation time function of the characteristics of the computing resources of the protecting virtual machine 120 and the set of parameters defining the approximation function of the parameters of the antivirus scan being performed by the scanning module 121 in dependence on the characteristics of the computing resources of the protecting virtual machine 120, having the form:

$$F_{BUSY}(\{F\}, \{C\}, \{P\}) = C(\{F\}) \times P(\{F\}),$$

where:
- $\{F\}$-are parameters characterizing the files received by the task forming module 114,
- $\{C\}$-are parameters describing the approximation time function of the characteristics of the computing resources of the protecting virtual machine 120,
- $\{P\}$-are parameters describing the approximation function of the parameters of the antivirus scan being performed by the scanning module 121 in dependence on the characteristics of the computing resources of the protecting virtual machine 120.

In step 217, the scanning module 121 may be configured to select a suitable scanning module in a distributed network having a plurality of protected and protecting virtual machines on the basis of the effectiveness function of the antivirus scan obtained in step 216.

The selected scanning module 121 may be configured to determine:
- a scanning module of one of the plurality of protecting virtual machines in the distributed network that is able to at least perform the antivirus scan of the files determined by the task forming module 114, using the computing resources available in the scheduled time slot;
- the scanning module 121 with the lowest calculated workload level;
- one scanning module 121 with a calculated workload level lower than an established threshold value;
- no less than two scanning module 121 out of the set of scanning module 121 whose combined calculated workload level is less than the combined workload level of the remaining scanning module 121 out of the set of scanning module 121.

In step 218, the start time for performing the antivirus scan may be determined for the scanning module 121 selected in step 217, so that at least one of the following criteria may be fulfilled:
- the antivirus scan takes the least time;
- the antivirus scan takes less time than scheduled;
- the antivirus scan will be completed not later than the scheduled time;
- a minimum number of computing resources of the protecting virtual machine 120 is needed to perform the antivirus scan;
- fewer computing resources of the protecting virtual machine 120 than scheduled are needed to perform the antivirus scan;

In step 221, the antivirus scan may be performed on the files determined in step 211.

In step 222, a verdict may be pronounced as to the detection of malicious files.

Figure 3:
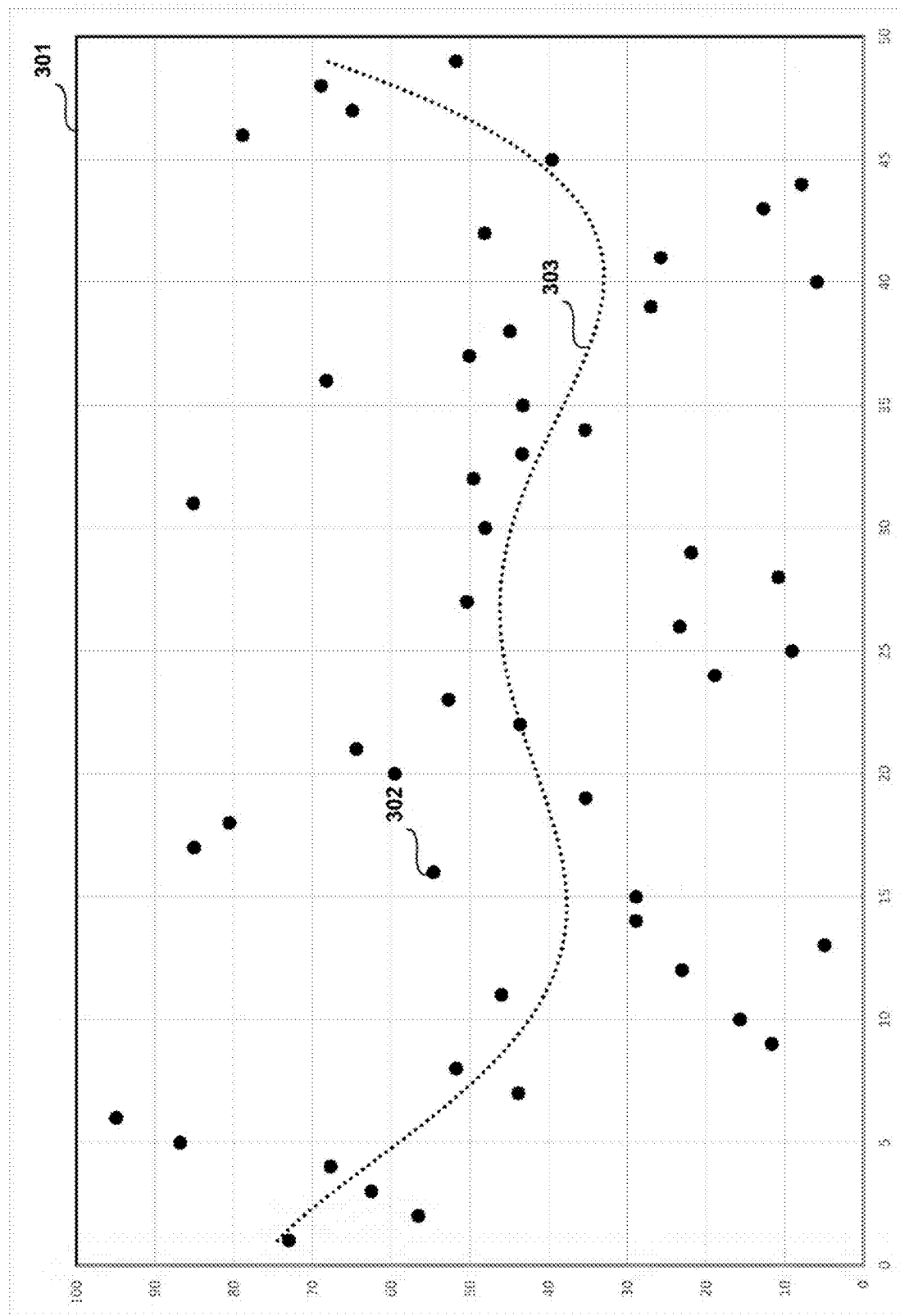
FIG. 3 illustrates the approximation time function of the characteristics of computing resources of protecting virtual machines according to aspects of the invention.

FIG. 3 illustrates the approximation time function of the characteristics of computing resources of protecting virtual machines according to aspects of the invention. The graph of the approximation time function of the characteristics of the computing resources of the protecting virtual machines 301 may contain the time characteristics of the computing resources of the protecting virtual machine 302 and the plotted approximation function 303.

The approximation time function 301 of the characteristics of the computing resources of the protecting virtual machine 120 may be determined by the dynamic computing module 112, which works as part of the thin client 110 on the protected virtual machine 100, on the basis of data characterizing the protecting virtual machine 120, obtained from the collecting module 111, which works as part of the aforementioned thin client 110.

The time characteristics of the computing resources of the protecting virtual machine 302 may include the workload level of the CPU of the protecting virtual machine (expressed in percent, from 0% to 100%) in dependence on time (expressed in seconds, from 0 to 50).

The characteristics of the computing resources of the protecting virtual machine 302 are available for 49 timestamps $\{X\}_{t_i}$. The problem is to construct an approximation function 303 with which one may calculate the presumptive workload of the protecting virtual machine at time $t_{50}$. For this purpose, one may employ one of several methods of regression analysis, such as the method of least squares.

In the first step, one of the functions defining the approximation function may be selected, such as a polynomial function of $6^{th}$ degree:

$$F_{CHAR}(X) = a_1 \times X^1 + a_2 \times X^2 + \ldots + a_6 \times X^6.$$

In the next step, the system of equations may be solved to calculate the coefficients of the equation $F_{CHAR}(X) a_1 \ldots a_6$, so that the condition may be fulfilled:

$$\Sigma_{t_i}(X_{t_i} - F_{CHAR}(X))^2 \rightarrow \min_X(a_1 \ldots a_6).$$

After the coefficients $a_1 \ldots a_6$ have been calculated, and knowing the value of time $t_{50}$, the value of the presumptive CPU load of the protecting virtual machine may be calculated. For the data depicted in the graph 301 for time $t_{50} = 50$ s, this may amount to $X_{50} = 85\%$.

Figure 4:
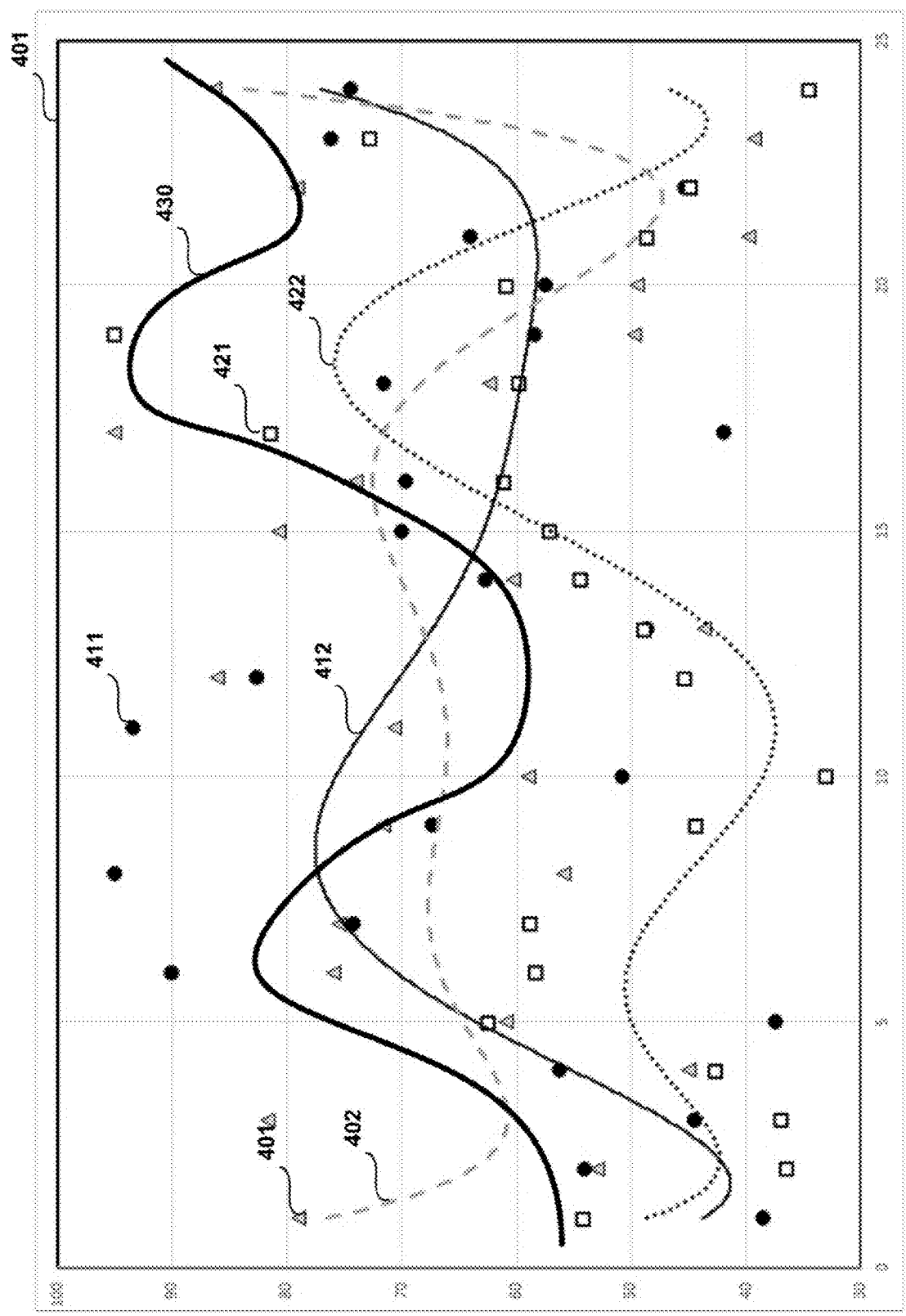
FIG. 4 illustrates the approximation time functions of the characteristics of computing resources of several protecting virtual machines according to aspects of the invention.

FIG. 4 illustrates the approximation time functions of the characteristics of computing resources of several protecting virtual machines according to apsects of the invention. The graph of the approximation time functions of the characteristics of the computing resources of several protecting virtual machines 400 may contain the time characteristics of the computing resources of the protecting virtual machines 401, 411 and 421, the approximation functions 402, 412 and 422 respectively plotted on the basis of an analysis of the time characteristics of the computing resources of the protecting virtual machines, and the resulting combined approximation function 430.

The approximation time functions 402, 412 and 422 of the characteristics of the computing resources of the protecting virtual machines 120.1, 120.2 and 120.3 respectively may be determined by the dynamic computing module 112, operating as part of the thin client 110 on the protected virtual machine 100 on the basis of the data characterizing the protecting virtual machines 120.1, 120.2 and 120.3 and obtained from the collecting module 111, operating as part of the aforementioned thin client 110.

The approximation time functions of the characteristics of the computing resources of the protecting virtual machines 401, 411 and 421 may be obtained by the methods discussed in the description of FIG. 3.

The time characteristics of the computing resources of the protecting virtual machines 401, 411 and 421 may include the workload level of the CPU of each of the protecting virtual machine (expressed in percent, from 0% to 100%) in dependence on time (expressed in seconds, from 0 to 25).

After calculating the approximation time functions of the CPU load of each protecting virtual machine, the approximation function of the combined load of the CPUs of the system of all protecting virtual machines 430 may be calculated:

$$X_j = \Sigma_i \{a_j\}_i.$$

For the selection of the time of sending the file for scanning to the protection server 120 of one of the protecting virtual machines, it may be necessary to determine when the combined load of the CPUs of all the protecting virtual machines may be at minimum. Knowing the time of minimum combined load of the CPUs of the protecting virtual machines, the protecting virtual machine with the minimum CPU load out of all available protecting virtual machines may be selected, and its protection server 120 may be sent the file for performance of an antivirus scan.

Figure 5:
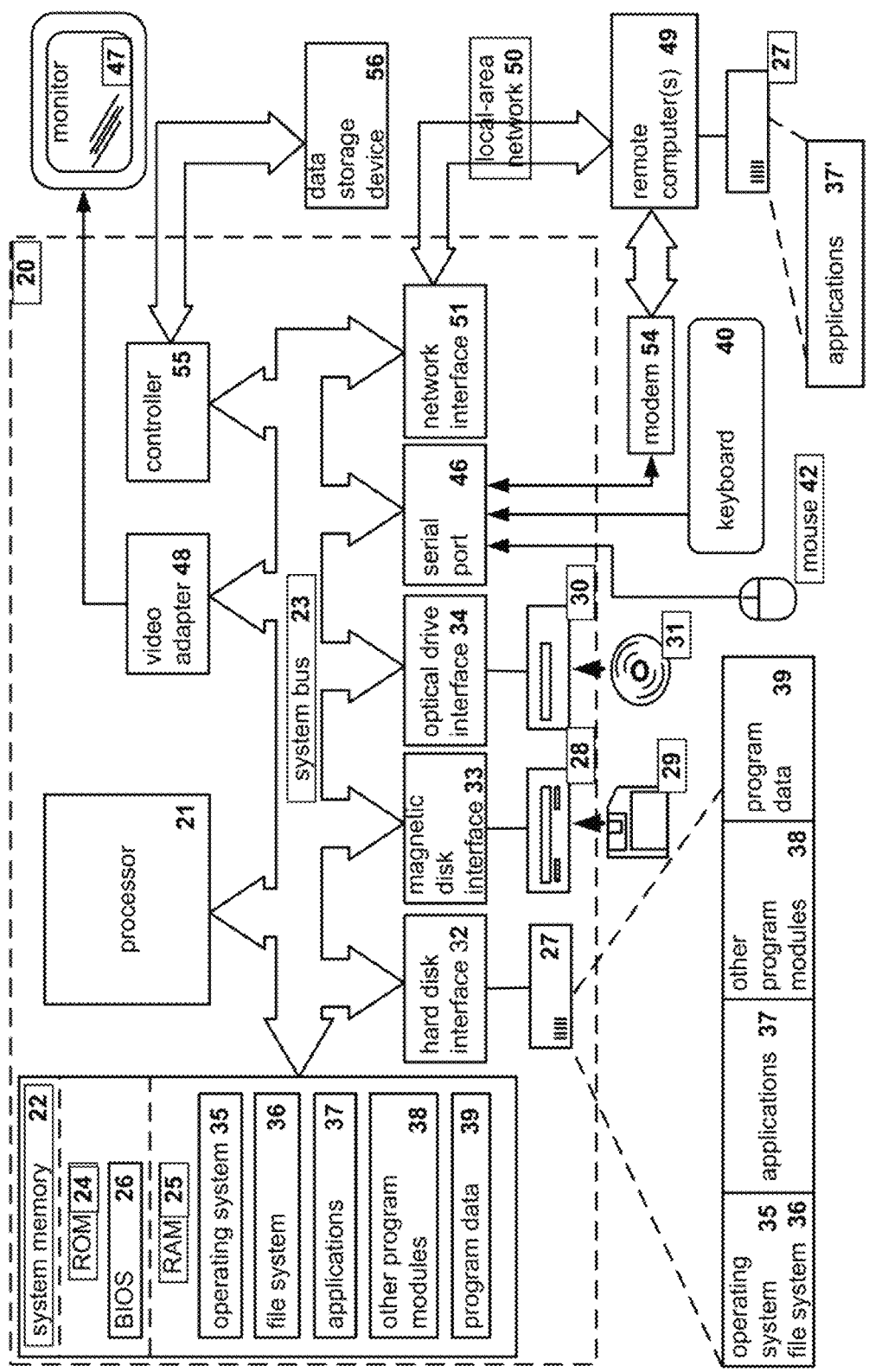
FIG. 5 illustrates a computer system, a personal computer or server, on which the disclosed systems and method can be implemented.

FIG. 5 illustrates an example computer system (which may be a personal computer or a server) on which the disclosed systems and methods can be implemented according to aspects of the invention. As shown, the computer system 20 (which may be a personal computer or a server) includes a central processing unit 21, a system memory 22 and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc.. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 4, supra). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for detecting malicious files in a distributed network having a plurality of protected virtual machines, the method comprising:
   obtaining, by a first protected virtual machine of the plurality of protected virtual machines, at least one file from a thin client installed on the first protected virtual machine, for performing an antivirus scan of the at least one file;
   collecting, by the first protected virtual machine, data relating to characteristics of computing resources of the plurality of protected virtual machines and one or more parameters relating to the antivirus scan;
   determining an approximation time function of the characteristics of the computing resources of the plurality of virtual machines based on analysis of the data relating to the characteristics of the computing resources;
   determining an approximation function of the one or more parameters relating to the antivirus scan based at least on collected data defining behavior of the antivirus scan;
   determining an approximation time function of effectiveness of the antivirus scan based at least on the approximation time function of the characteristics of the computing resources and the approximation function of the one or more parameters, wherein effectiveness of the antivirus scan is determined by comparing defined properties of the antivirus scan with predetermined criteria; and
   based at least on the approximation time function of effectiveness of the antivirus scan, selecting at least one virtual machine from the plurality of virtual machines to perform the antivirus scan in order to determine whether the at least one file is malicious according to the desired effectiveness of the antivirus scan.

2. The method of claim 1, wherein selecting the at least one virtual machine comprises determining the most effective start time for performing the antivirus scan by fulfilling at least on one of the following criteria:
   the antivirus scan taking the least time;
   the antivirus scan taking less time than scheduled;
   the antivirus scan that will be completed no later than a scheduled time;
   a minimum number of computing resources of the virtual machine is needed to perform the antivirus scan; or
   fewer computing resources of the virtual machine than scheduled are needed to perform the antivirus scan.

3. The method of claim 1, wherein selecting at least one virtual machine comprises:
   detecting that the at least one virtual machine is able to at least perform the antivirus scan of the at least one file using computing resources available in a scheduled time slot;
   detecting the at least one virtual machine with the lowest calculated workload level among the plurality of virtual machines in the distributed network;
   detecting the at least one virtual machine with a calculated workload level lower than an established threshold value; or
   detecting no less than two virtual machines of the plurality of virtual machines whose combined calculated workload level is less than the combined workload level of the remaining virtual machines of the plurality of virtual machines.

4. The method of claim 1, wherein collecting the data relating to the characteristics of computing resources of the plurality of virtual machines comprises at least one of:
   detecting a time period between obtaining the at least one file and determining whether the at least one file is malicious;
   detecting a number of files transmitted to the virtual machine for the antivirus scan; and
   determining a computing capacity of each of the plurality of the virtual machines.

5. The method of claim 1, wherein the one or more parameters relating to the antivirus scan comprise at least one of:
   methods for detecting malicious files used by the plurality of virtual machines, the methods comprising at least one of: a signature analysis, a heuristic analysis, an analysis of emulation results, and an analysis of black and white lists; and
   the characteristics of computing resources of the plurality of virtual machines used for performing the antivirus scan,
   wherein parameters for the methods for detecting malicious files comprise: maximum time of the antivirus scan and depth of emulation of the at least one file being scanned.

6. The method of claim 5, wherein the methods for detecting malicious files are determined based at least on the maximum time during which the antivirus scan takes place, and an emulation depth of files being scanned.

7. The method of claim 1, wherein the approximation time function of the characteristics of the computing resources of the plurality of virtual machines is determined based at least on the collected data relating to the characteristics of the computing resources of each virtual machine, characteristics of computing resources of each virtual machine which are accessible at a selected time, the time of determination of characteristics of the computing resources of each virtual machine, and the time for which it is necessary to determine the characteristics of the computing resources of each virtual machine.

8. The method of claim 1, wherein the approximation function of the one or more parameters relating to the antivirus scan is determined based at least on data relating to presumptive parameters of the antivirus scan for the characteristics of the computing resources, and characteristics of the computing resources of each virtual machine for performing the antivirus scan.

9. The method of claim 1, wherein the approximation time function of effectiveness of the antivirus scan is determined based on parameters defining a type and size of the at least one file.

10. A system for detecting malicious files in a distributed network having a plurality of protected virtual machines, the system comprising:
a hardware processor, configured to:
  obtain at least one file from a thin client installed on a first protected virtual machine, for performing an antivirus scan of the at least one file;
  collect data relating to characteristics of computing resources of the plurality of protected virtual machines and one or more parameters relating to the antivirus scan;
  determine an approximation time function of the characteristics of the computing resources of the plurality of virtual machines based on analysis of the data relating to the characteristics of the computing resources;
  determine an approximation function of the one or more parameters relating to the antivirus scan based at least on collected data defining behavior of the antivirus scan;
  determine an approximation time function of effectiveness of the antivirus scan based at least on the approximation time function of the characteristics of the computing resources and the approximation function of the one or more parameters, wherein effectiveness of the antivirus scan is determined by comparing defined properties of the antivirus scan with predetermined criteria; and
  based at least on the approximation time function of effectiveness of the antivirus scan, select at least one virtual machine from the plurality of virtual machines to perform the antivirus scan in order to determine whether the at least one file is malicious according to the desired effectiveness of the antivirus scan.

11. The system of claim 10, wherein the hardware processor is configured to select the at least one virtual machine from the plurality of virtual machines to perform the antivirus scan by determining the most effective start time for performing the antivirus scan by fulfilling at least on one of the following criteria:
  the antivirus scan taking the least time;
  the antivirus scan taking less time than scheduled;
  the antivirus scan that will be completed no later than a scheduled time;
  a minimum number of computing resources of the virtual machine is needed to perform the antivirus scan; or
  fewer computing resources of the virtual machine than scheduled are needed to perform the antivirus scan.

12. The system of claim 10, wherein the virtual machine hardware processor is configured to select the at least one virtual machine from the plurality of virtual machines to perform the antivirus scan by:
  detecting that the at least one virtual machine is able to at least perform the antivirus scan of the at least one file using computing resources available in a scheduled time slot;
  detecting the at least one virtual machine with the lowest calculated workload level among the plurality of virtual machines in the distributed network;
  detecting the at least one virtual machine with a calculated workload level lower than an established threshold value; or
  detecting no less than two virtual machines of the plurality of virtual machines whose combined calculated workload level is less than the combined workload level of the remaining virtual machines of the plurality of virtual machines.

13. The system of claim 10, wherein the hardware processor is configured to collect the data relating to the characteristics of computing resources of the plurality of virtual machines via at least one of:
  detecting a time period between obtaining the at least one file and determining whether the at least one file is malicious;
  detecting a number of files transmitted to the virtual machine for the antivirus scan; and
  determining a computing capacity of each of the plurality of the virtual machines.

14. The system of claim 10, wherein the one or more parameters relating to the antivirus scan comprise at least one of:
  methods for detecting malicious files used by the plurality of virtual machines, the methods comprising at least one of: a signature analysis, a heuristic analysis, an analysis of emulation results, and an analysis of black and white lists; and
  the characteristics of computing resources of the plurality of virtual machines used for performing the antivirus scan,.
  wherein parameters for the methods for detecting malicious files comprise: maximum time of the antivirus scan and depth of emulation of the at least one file being scanned.

15. The system of claim 14, wherein the methods for detecting malicious files are determined based at least on the maximum time during which the antivirus scan takes place, and an emulation depth of files being scanned.

16. The system of claim 10, wherein the approximation time function of the characteristics of the computing resources of the plurality of virtual machines is determined based at least on the collected data relating to the characteristics of the computing resources of each virtual machine, characteristics of computing resources of each virtual machine which are accessible at a selected time, the time of determination of characteristics of the computing resources of each virtual machine, and the time for which it is necessary to determine the characteristics of the computing resources of each virtual machine.

17. The system of claim 10, wherein the approximation function of the one or more parameters relating to the antivirus scan is determined based at least on data relating to presumptive parameters of the antivirus scan for the characteristics of the computing resources, and characteristics of the computing resources of each virtual machine for performing the antivirus scan.

18. The system of claim 10, wherein the approximation time function of effectiveness of the antivirus scan is determined based on parameters defining a type and size of the at least one file.

19. A non-transitory computer readable medium storing thereon computer executable instructions for detecting malicious files in a distributed network having a plurality of protected virtual machines, including instructions for:
- obtaining, by a first protected virtual machine of the plurality of protected virtual machines, at least one file from a thin client installed on the first protected virtual machine, for performing an antivirus scan of the at least one file;
- collecting, by the first protected virtual machine, data relating to characteristics of computing resources of the plurality of protected virtual machines and one or more parameters relating to the antivirus scan;
- determining an approximation time function of the characteristics of the computing resources of the plurality of virtual machines based on analysis of the data relating to the characteristics of the computing resources;
- determining an approximation function of the one or more parameters relating to the antivirus scan based at least on collected data defining behavior of the antivirus scan;
- determining an approximation time function of effectiveness of the antivirus scan based at least on the approximation time function of the characteristics of the computing resources and the approximation function of the one or more parameters, wherein effectiveness of the antivirus scan is determined by comparing defined properties of the antivirus scan with predetermined criteria; and
- based at least on the approximation time function of effectiveness of the antivirus scan, selecting at least one virtual machine from the plurality of virtual machines to perform the antivirus scan in order to determine whether the at least one file is malicious according to the desired effectiveness of the antivirus scan.

20. The computer readable medium of claim 19, wherein the approximation time function of the characteristics of the computing resources of the plurality of virtual machines is determined based at least on the collected data relating to the characteristics of the computing resources of each virtual machine, characteristics of computing resources of each virtual machine which are accessible at a selected time, the time of determination of characteristics of the computing resources of each virtual machine, and the time for which it is necessary to determine the characteristics of the computing resources of each virtual machine, and
- wherein the approximation function of the one or more parameters relating to the antivirus scan is determined based at least on data relating to presumptive parameters of the antivirus scan for the characteristics of the computing resources, and characteristics of the computing resources of each virtual machine for performing the antivirus scan.

* * * * *